Oct. 23, 1962 E. B. NOLT 3,059,569
HAY BALER
Filed Feb. 16, 1961 3 Sheets-Sheet 1
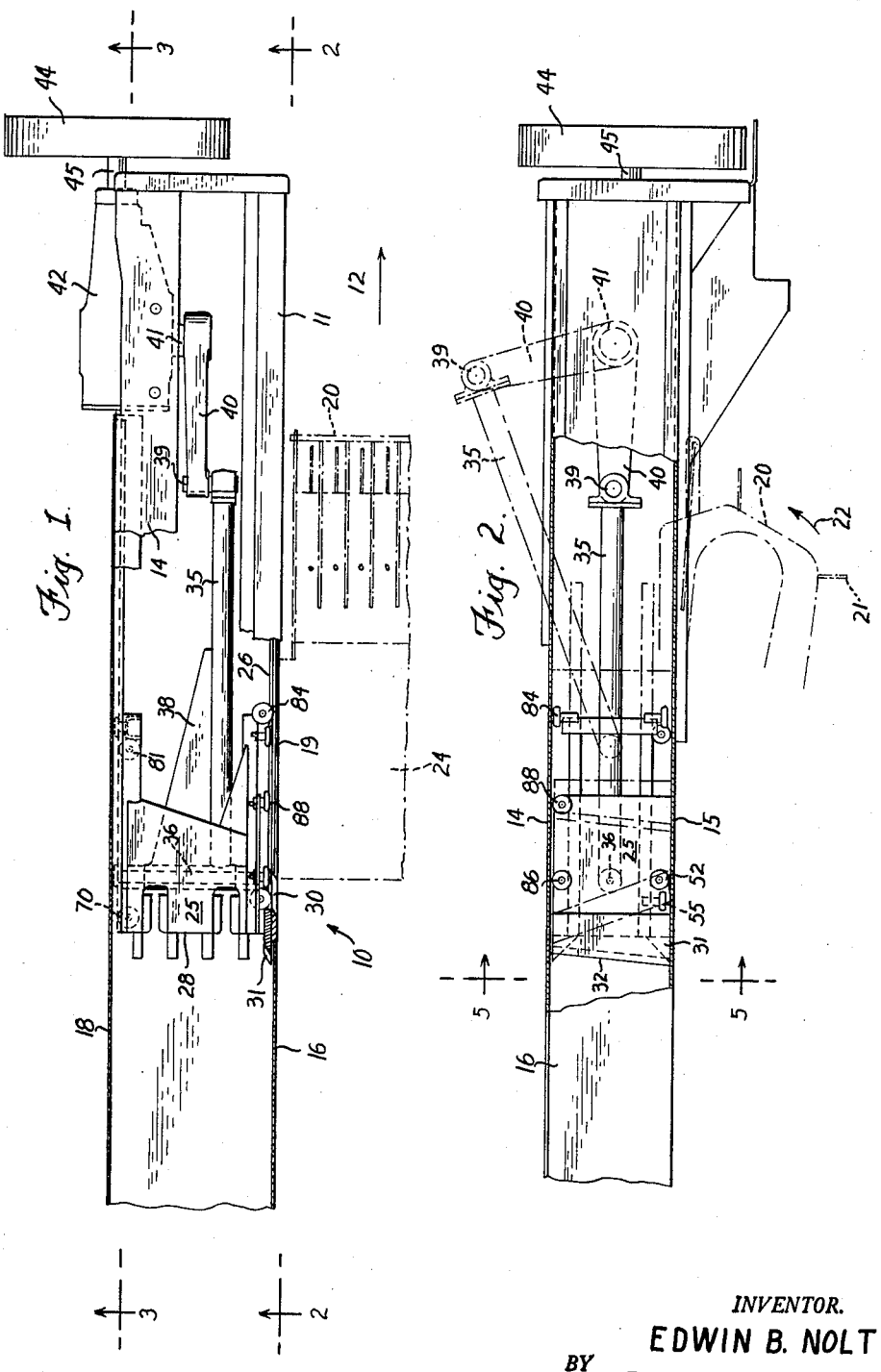
INVENTOR.
EDWIN B. NOLT
BY Joseph A. Brown
ATTORNEY Oct. 23, 1962     E. B. NOLT     3,059,569
HAY BALER
Filed Feb. 16, 1961     3 Sheets-Sheet 2
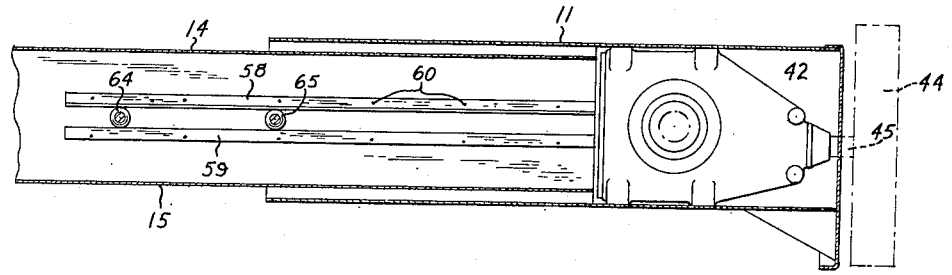
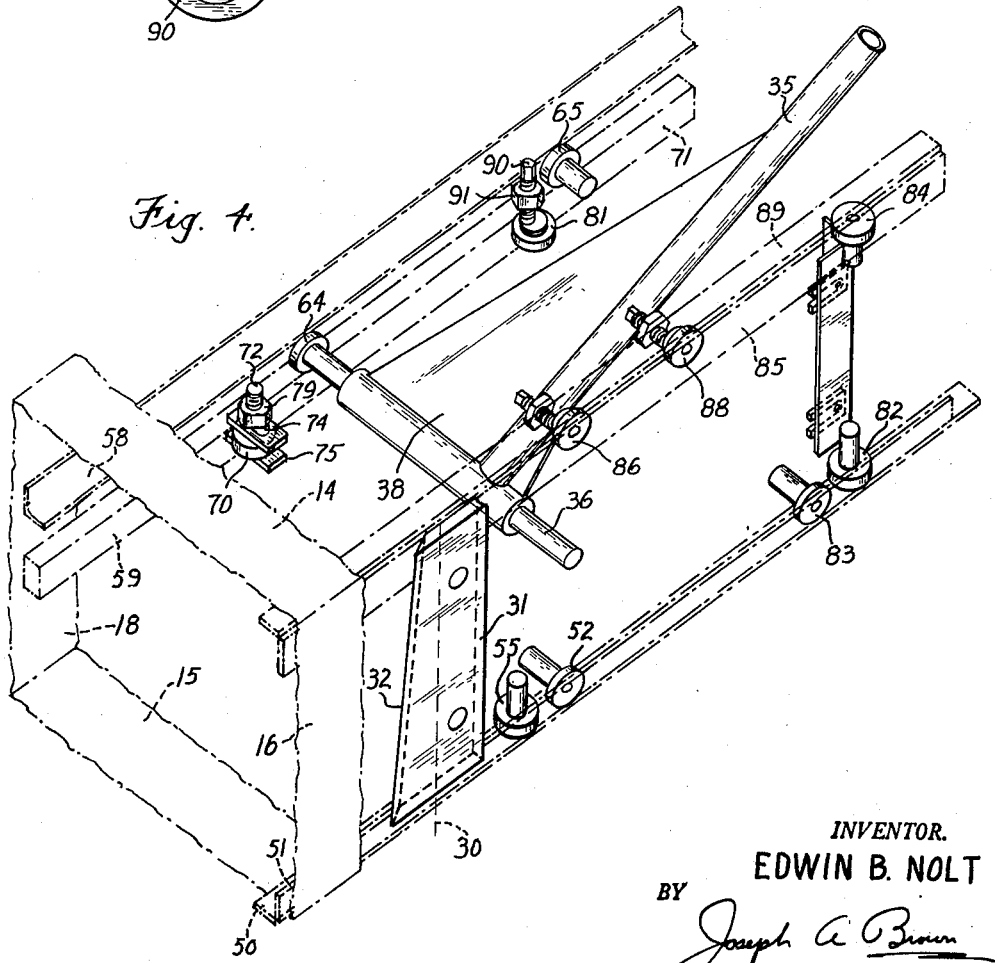
INVENTOR.
EDWIN B. NOLT
BY
*Joseph A. Brown*
ATTORNEY Oct. 23, 1962  E. B. NOLT  3,059,569
HAY BALER
Filed Feb. 16, 1961  3 Sheets-Sheet 3

INVENTOR.
EDWIN B. NOLT
BY
Joseph A. Brown
ATTORNEY

United States Patent Office 3,059,569
Patented Oct. 23, 1962

3,059,569
HAY BALER
Edwin B. Nolt, New Holland, Pa., assignor to Sperry Rand Corporation, New Holland, Pa., a corporation of Delaware
Filed Feb. 16, 1961, Ser. No. 89,765
12 Claims. (Cl. 100—98)

This invention relates generally to hay balers and more particularly to means for establishing the reciprocation of a baler plunger relative to a bale case in which it is operable to thereby provide precise operating clearance between a plunger knife and a bale case shear bar and proper support for the plunger in its reciprocating movements.

A conventional hay baler has a bale case and a plunger reciprocable therein, both of which are rectangular in cross section. The bale case extends horizontally relative to the ground and has a side wall provided with a feed opening for crop material. The baler has a pick-up and feeding mechanism to deliver crop material through the feed opening and into the bale case. The reciprocating plunger operates to compress the crop material to form bales. When the plunger is retracted, the bale case feed opening is opened. However, when the plunger moves rearwardly on a working stroke, one side face of the plunger closes the opening. To separate material outside the bale case from material delivered into the bale case, the plunger is provided with a knife cooperative with a shear bar on the bale case.

The baler plunger has considerable mass and is reciprocated at high speed, such as sixty or more strokes a minute. It is necessary to adequately support the baler plunger for such rapid reciprocating movements and also to provide a close operating clearance between the plunger knife and the baler shear bar so that the crop material will be properly sheared with each working stroke of the plunger. Heretofore, providing a plunger which operates with precision relative to a bale case has involved substantial manufacturing costs particularly in the fabrication of the bale case.

One object of this invention is to provide means for adjustably mounting a plunger in a bale case whereby a knife on the plunger can be set in precise operating relation to a shear bar on the bale case.

Another object of this invention is to provide a plunger support structure so designed that the plunger may be adjusted relative to the bale case in which it is reciprocated and the bale case components do not have to be manufactured with close tolerances thereby reducing the overall cost of fabrication of the bale case.

Another object of this invention is to provide a mounting structure for a plunger wherein the plunger can be adjusted relative to the bale case by manipulating a single adjusting means, such means being readily accessible.

A further object of this invention is to provide a plunger support structure of the character described whereby wear resulting between the plunger knife and bale case shear bar can be readily compensated for.

A further object of this invention is to provide a baler plunger mounted on a series of rollers which cooperate to provide proper support for the plunger during its reciprocating movements regardless of the adjusted position of the plunger relative to the bale case in which it operates.

A still further object of this invention is to provide plunger support means of the character described which is low in cost and easy to adjust.

Other objects of this invention will be apparent hereinafter from the specification and from the recital in the appended claims.

In the drawings:

FIG. 1 is a fragmentary plan view of the bale case portion of a hay baler, part of the top of the bale case being broken away to show a plunger reciprocable therein and mounted for adjustment by means constructed according to this invention;

FIG. 2 is a section taken on the line 2—2 of FIG. 1 looking in the direction of the arrows and showing the plunger at the end of a working stroke in solid lines and in an intermediate retracted position in dotted lines;

FIG. 3 is a section taken on the line 3—3 of FIG. 1 looking in the direction of the arrows and showing the adjustable guide track used in the plunger adjustment means;

FIG. 4 is a perspective view, on an enlarged scale, showing the components of the plunger adjustment means and their relationship to each other and to the bale case;

FIG. 9 is a side elevation of one of the adjustable rollers of the plunger adjustment means.

Figure 5:
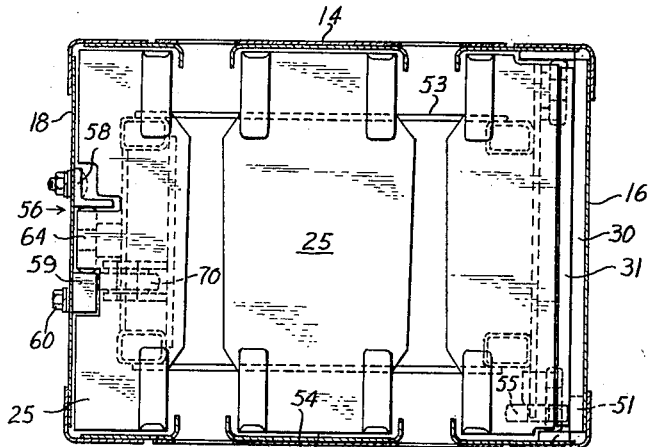
FIG. 5 is an enlarged section taken on the line 5—5 of FIG. 2 looking in the direction of the arrows.
Figures 6, 7:
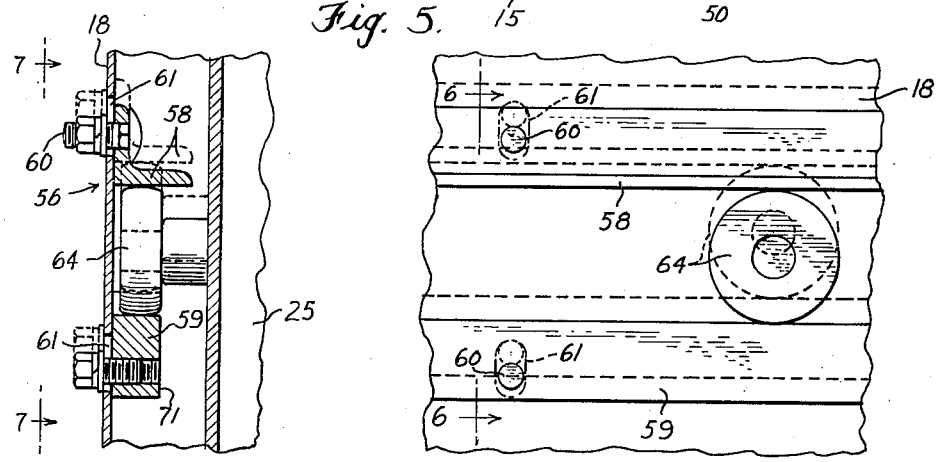
FIG. 6 is an enlarged transverse section of the guide track of the plunger adjustment means and taken generally on the line 6—6 of FIG. 7 looking in the direction of the arrows.
FIG. 7 is a side elevation taken on the line 7—7 of FIG. 6 looking in the direction of the arrows and showing the plunger in one position of adjustment in solid lines and in another position of adjustment in dotted lines.

Referring now to the drawings by numerals of reference, 10 denotes a hay baler having a bale case 11 which extends in a fore-and-aft direction relative to the direction of travel of the baler indicated by the arrow 12 in FIG. 1. Bale case 11 is a rectangular in cross-section having a top wall 14, bottom wall 15 and side walls 16 and 18. Side wall 16 has a feed opening 19 through which crop material may be fed into the bale case. A pick-up 20, having fingers 21 movable as indicated by the arrow 22, FIG. 2, operates to elevate previously cut and windrowed material and deliver it rearwardly to a feed platform 24. A feeder mechanism, not shown, operates to convey material across platform 24 and into bale case 11 through opening 19. The feeder mechanism may be similar to that shown in U.S. Patent No. 2,950,670.

The hay fed into bale case 11 is compressed into bales by a reciprocable plunger 25 which moves back and forth across opening 19. When in extended position, FIG. 1, a plate 26 on the plunger closes opening 19. When the plunger is retracted, the feeder mechanism operates to deliver material in the path of the working face 28 of the plunger. To sever the crop material into separate charges, a fixed shear bar 30 (FIG. 1) is provided on the side 16 of the bale case and along the vertical rear edge of opening 19. Plunger 25 has a vertically extending knife 31 cooperative with shear bar 30. The cutting edge 32 of the knife (FIG. 4) extends at an angle relative to vertical whereby each time plunger knife 31 passes shear bar 30, a shearing action takes place.

To reciprocate plunger 25, a fore-and-aft extending connecting rod 35 is provided. Rod 35 is pivotally connected at its rear end to plunger 25 by a cross shaft 36. A web-plate 38 is provided to strengthen the connection. The forward end of rod 35 is pivotally connected by pin 39 to a crank arm 40 mounted on the output shaft 41 of a gear box 42. Gear box 42 is mounted on side wall 18 and receives power from drive means comprising a flywheel 44 and input shaft 45.

Plunger 25 has considerable mass; and, it is reciprocated at a high rate of speed. To properly support the plunger in its reciprocating movements and to provide precise operating clearance between plunger knife 31 and shear bar 30, the plunger is supported by a roller-track arrangement which will now be described.

The corner of bale case 11 formed by bottom wall 15 and side wall 16 is provided with a flat, fixed support track 50 (FIGS. 4 and 5) and a fixed vertical guide element or track 51. Plunger 25 has a framework 53 to which a roller 52 is connected adjacent knife 31. Roller 52 rides on track 50 and supports the plunger in a vertical direction. Roller 52 rotates about a fixed horizontal axis and helps to maintain the bottom 54 of the plunger operatively clear of bottom wall 15 of the bale case. Adjacent and slightly rearwardly of roller 52 is a plunger roller or contact element 55 engageable with guide element 51 and providing a pivot point 57 (FIG. 8) between plunger 25 and bale case 11. Roller 55 is rotatable about a vertical axis. Guide element 51 is of such thickness and so located that when roller 55 is in engagement with element 51, a precise operating clearance is provided between the lower end of plunger knife 31 and the lower end of shear bar 30.

To provide proper operating clearance throughout the full vertical extent of plunger knife 31 relative to shear bar 30, the plunger is adapted to be pivoted as a whole about point 57 by means of a vertically adjustable guide track 56 on side wall 18 of the bale case. Track 56 is shown best in FIGS. 3, 5, 6 and 7 and comprises horizontally extending upper and lower track members 58 and 59, respectively. These track members are connected to side wall 18 of bale case 11 by bolts 60. Bolts 60 extend through vertically elongate slots 61 in the bale case whereby the track can be vertically adjusted relative to side wall 18 as indicated by arrows 62, FIG. 8. Plunger 25 has rollers 64 and 65 which ride on track 56 and between the track members 58 and 59. These rollers and roller 52 support the plunger above bale case bottom 15.

Figure 8:
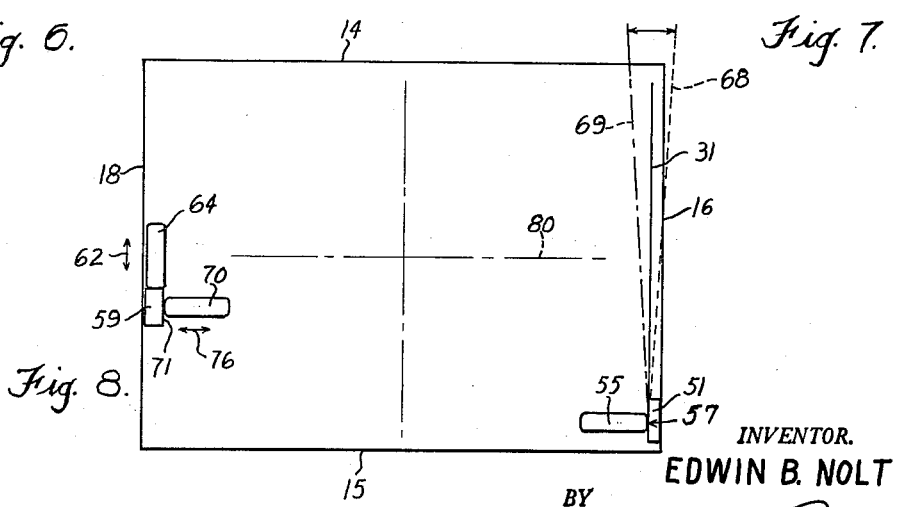
FIG. 8 is a diagrammatic view illustrating the operation of the plunger adjustment means.

As shown in FIG. 8, when track 56 is adjusted upwardly, roller 55 pivots in a clockwise direction about point 57 to shift plunger knife 31 toward dotted position 68. When track 56 is adjusted downwardly, roller 55 pivots counterclockwise to shift plunger knife 31 toward dotted position 69. Since the lower end of knife 31 is properly aligned at the start with the lower end of shear bar 30, vertical adjustment of track 56, up or down as required, provides proper operating clearance throughout the respective lengths of the plunger knife and shear bar.

To hold roller 55 in firm engagement with guide element 51, plunger 25 has an adjustable roller 70 (FIGS. 4 and 8) engaging the inside face 71 of track member 59. Roller 70 is carried on a stud 72 which passes through slots 74 in brackets 75 on plunger framework 53. Slots 74 extend transverse to bale case 11 and provide means whereby roller 70 can be adjusted toward or away from track member 59 as indicated by arrow 76 in FIG. 8. A nut 79 is threaded onto stud 72 to hold roller 70 in adjusted position. Roller 55 is located adjacent bottom wall 15 of bale case 11 and below a medial horizontal plane 80 (FIG. 8) of the base case. Roller 70 is also located below such plane so that adjustment of roller 70 will tend to push roller 55 against guide element 51 rather than produce pivoting of the plunger.

To further hold plunger 25 against guide element 51, a second adjustable roller 81 is provided on the plunger framework and engaging face 71 of track member 59. Roller 81 is substantially forwardly of roller 70, relative to the bale case, and opposite roller 81 on the other side of the plunger is a lower roller 82 and an upper roller 84. Rollers 82 and 84 are rotatable about vertical axes. Roller 82 engages guide element 51 and roller 84 engages track member 85 (FIG. 4). Adjacent roller 82 is a roller 83 rotatable about a horizontal axis and engageable with track 50. On the same side of the plunger, two rollers 86 and 88 are provided, rotatable about horizontal axes and engageable with track member 89 affixed to bale case top wall 14 adjacent side wall 16.

Rollers 81, 86 and 88 are similarly constructed. As shown in FIG. 9, which shows roller 81, a stud 90 is provided the axis of which is eccentric relative to the roller axis. Stud 90 is fastened to plunger framework 53 by a nut 91 which when loosened allows stud 90 to be rotated to thus vary the position of roller 81 and its engagement with track member 59. Rollers 86 and 88 are adjustable in the same way to regulate their engagement with track member 89. Rollers 82, 83 and 84 are fixed rollers.

In manufacture, when the plunger is inserted into the bale case 11 the roller 52 establishes the initial operating clearance between one side of the bottom 54 of the plunger and the bottom 15 of the bale case. The assembler then adjusts the roller 70 as required to provide proper engagement of the roller 55 with the guide element 51. With the roller 55 in engagement with the guide element 51, the lower end of the plunger knife 31 and the lower end of shear bar 30 are in precise operating alignment. To provide proper operating clearance for the full lengths of the cooperating knives, the track 56 is adjusted upwardly or downwardly to pivot the plunger knife 31 inwardly or outwardly as required about the pivot point 57. When the track 56 is in desired position, it is locked in place. Track 56 supports the side of the plunger opposite roller 52 from bottom 15. After adjustment of track 56, roller 81 is adjusted to be sure that the rollers 82 and 84 are in engagement with their respective track members and then rollers 86 and 88 are adjusted so that they are in engagement with the upper track member 89.

With this arrangement, the bale case 11 does not have to be manufactured with the precision which would be required for plunger mountings of prior design. Precision is required at one corner only of the bale case, namely the corner formed by bottom wall 15 and side wall 16. The adjustability provided throughout the plunger structure properly orients the plunger relative to the remainder of the bale case and insures that the plunger knife 31 operates in precise relation to the shear bar 30. Further, the adjustable mountings for the plunger can be varied to take up for wear in the rollers or the tracks which they engage. Once the roller 55 is in engagement with the guide element 51, it requires merely a single adjustment to properly set the plunger knife relative to the bale case shear bar. Such adjustment is achieved by raising or lowering the track 56. The other rollers of the plunger function to support the plunger in its reciprocating movements but do not relate to the establishment of the position of the plunger knife with the baler shear bar.

The structure described provides substantial savings in the cost of manufacture of the bale case and the plunger. But more important, the design enables the assembler to position the baler plunger in accurate and precise relationship relative to the bale case in which it is to operate. Since the types of rollers used on the plunger are kept to a minimum, production and assembly costs are reduced.

While this invention has been described in connection with a particular embodiment thereof, it will be understood that it is capable of further modifications, and this application is intended to cover any variations, uses or adaptations following, in general, the principles of the invention and including such departures as come within known or customary practice in the art to which the invention pertains, and as fall within the scope of the invention or the limits of the appended claims.

Having thus described my invention, what I claim is:

1. A hay baler having a rectangular bale case provided with a pair of horizontal walls, namely a top and a bottom wall, and a pair of side walls, one of said side walls having an infeed opening, a vertically extending shear bar mounted on said side wall at said opening, a plunger reciprocal in said bale case and past said opening, a vertically extending knife carried on said plunger and cooperative with said shear bar to sever crop material fed into said bale case through said opening, and means for adjusting said plunger relative to said bale case to provide desired operating clearance between said shear bar and knife, said adjusting means comprising a guide element on said bale case adjacent the corner formed by said one side wall and one of said horizontal walls, a contact element on said plunger engaging said guide element, said guide and contact elements being so located that when in engagement they establish proper clearance between one end of said plunger knife and one adjacent end of said shear bar, a rail supported on the other of said side walls, means on said plunger engaging said rail, and means for vertically adjusting said rail relative to said bale case, said plunger when vertically adjusted along said other side wall pivoting about said contact element and said guide element whereby proper operating clearance between the other end of said knife and the other end of said shear bar may be established.

2. A hay baler as recited in claim 1 wherein said guide element has a vertical side face and said plunger contact element engages said side face.

3. A hay baler as recited in claim 2 wherein a member is carried on said plunger in engagement with said other side wall, and means is provided for adjusting said member toward said other side wall to force said plunger contact element against said guide element.

4. A hay baler as recited in claim 1 wherein said rail extends horizontally and comprises a pair of parallel extending, vertically spaced track members, and said means on said plunger engaging said rail extends between said track members.

5. A hay baler as recited in claim 1 wherein said guide element is located adjacent said bale case bottom wall, and said rail is located adjacent a medial horizontal plane between said top and bottom walls.

6. A hay baler as recited in claim 5 wherein means is provided on said plunger and engaging said other side wall to hold said plunger contact element in engagement with said guide element, said holding means being located below a medial horizontal plane of said bale case.

7. A hay baler as recited in claim 6 wherein said rail comprises an upper and a lower rail element, and said holding means is engageable with said lower rail element.

8. A hay baler as recited in claim 6 wherein said guide element comprises a fixed longitudinal rail having a vertical side face, and said plunger contact element comprises a roller engaging said side face, said roller being rotatable about a vertical axis.

9. A hay baler as recited in claim 7 wherein said plunger carries a roller rotatable about a horizontal axis, said roller being located adjacent said one bale case side wall and engaging said bottom wall to vertically support said plunger adjacent said one end of said plunger knife.

10. A hay baler as recited in claim 1 wherein said means for vertically adjusting said rail includes fastening members extending through openings formed in the rail and through vertical slots formed in the other of said side walls.

11. A hay baler as recited in claim 1 wherein said rail is located substantially mid-way between said top and bottom walls, and said plunger carries means engaging the rail for forcing said plunger contact element into engagement with said guide element.

12. A hay baler having a generally rectangular bale case provided with a top wall, a bottom wall and a pair of side walls, one of said side walls having an infeed opening, a shear bar mounted on said side wall at said opening, a plunger reciprocal in said bale case and past said opening, a knife carried on said plunger and cooperative with said shear bar to sever crop material fed into said bale case through said opening, and means for adjusting said plunger relative to said bale case to provide proper operating clearance between said knife and shear bar, said adjusting means comprising, in combination, a guide element connected to said bale case adjacent a corner formed by said one side wall and said bottom wall, a contact element on said plunger engaging said guide element and pivotal relative thereto, said guide and contact elements being so located that when in engagement they establish proper clearance between one end of said plunger knife and one adjacent end of said shear bar, means interposed between said plunger and the other of said side walls to hold said guide and contact elements in engagement as said plunger is reciprocated, and means connecting said plunger to said bale case to pivot the plunger about said guide and contact elements and establish proper operating clearance between the other end of said knife and the other end of said shear bar.

References Cited in the file of this patent

UNITED STATES PATENTS

| | | |
|---|---|---|
| 2,293,679 | Barker | Aug. 18, 1942 |
| 2,362,861 | Russell | Nov. 14, 1944 |
| 2,720,160 | Tice et al. | Oct. 11, 1955 |
| 2,923,230 | Bornzin | Feb. 2, 1960 |

FOREIGN PATENTS

| | | |
|---|---|---|
| 846,395 | Great Britain | Aug. 31, 1960 |
| 846,396 | Great Britain | Aug. 31, 1960 |